Oct. 21, 1969 DE WITT T. MEEK, JR 3,473,623

REMOTE CONTROL GOLF BAG CART

Filed May 17, 1967  2 Sheets-Sheet 1

DeWitt T. Meek, Jr.
INVENTOR.

BY William S. Dorman
ATTORNEY

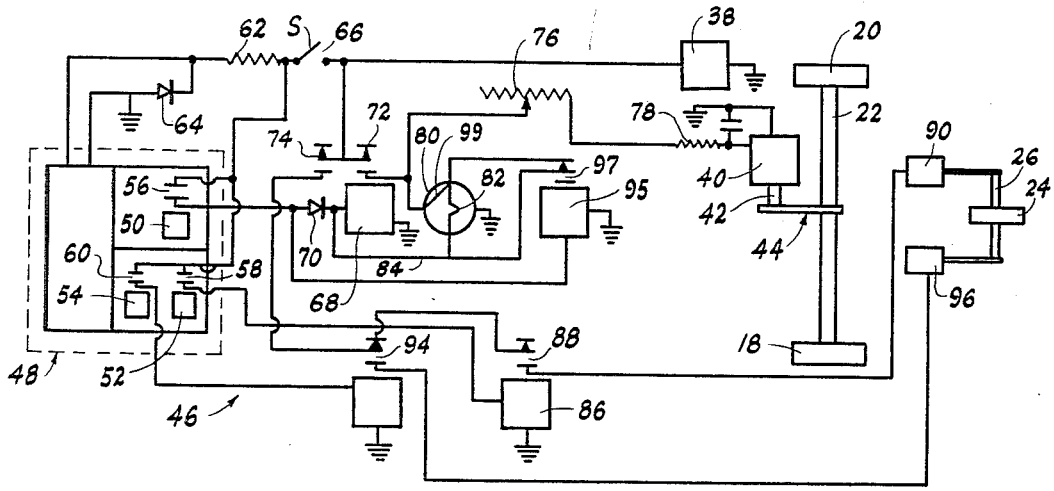
Fig. 4
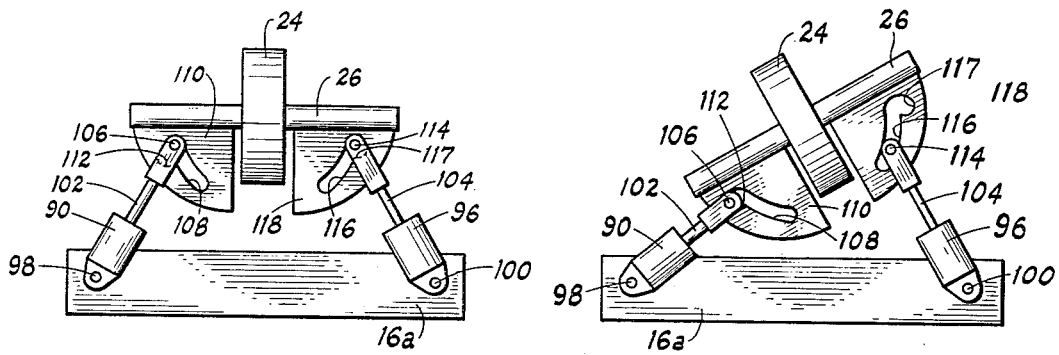
Fig. 5
Fig. 6
DeWitt T. Meek, Jr.
INVENTOR.
BY William S. Dorman
ATTORNEY United States Patent Office
3,473,623
Patented Oct. 21, 1969

3,473,623
REMOTE CONTROL GOLF BAG CART
De Witt T. Meek, Jr., Tulsa, Okla.; Daisy Lockewitz
Meek, acting executrix of said D. T. Meek, Jr., deceased
Filed May 17, 1967, Ser. No. 639,161
Int. Cl. B62d 5/00
U.S. Cl. 180—79.1                  6 Claims

ABSTRACT OF THE DISCLOSURE

A powered golf bag cart wherein the cart may be started, stopped and guided in movement by the user through a remote control unit. The cart includes a receiver and solenoids selectively activated by the receiver for guiding the cart.

---

This invention relates to improvements in powered golf bag carts, and more particularly, but not by way of limitation, to a powered golf bag cart which may be operated by a remote control unit.

The game of golf has become extremely popular in this country, and with the great increase in the number of golf players, it becomes more difficult to obtain the services of a caddy or the like for carrying of the golf bag. As a result wheeled carts for supporting and carrying the golf bag are in widespread use. These carts normally comprise a frame-like structure carried by two wheels, and of a configuration for receiving the golf bag thereon in such a manner that the cart may be manually pulled along the course by the golfer as he moves from one place to another during the play of the game. In order to facilitate the moving or pulling of a golf bag cart, powered devices have been developed, such as that shown in the Beggs Patent No. 3,059,713, issued Oct. 23, 1962, and entitled "Self-Propelled Golf Bag Cart." This type of cart, however, must be steered or guided and directed in movement by the user as he travels along the golf course.

The present invention contemplates a powered golf bag cart particularly designed and constructed for operation by remote control. The power unit of the cart may be started and stopped by the user through the proper manipulation of a remote control transmitter. In addition, the direction of movement of the cart may be guided by manipulation of the transmitter whereby the cart may follow along, or precede, the golfer as he moves throughout the course during the play of the game. The cart comprises a three wheeled frame-like structure of a configuration particularly designed for conveniently receiving and supporting the usual golf bag and golf clubs carried therein. The wheels are preferably arranged in the well known tricycle arrangement, and the steering of the cart is accomplished through turning of the single wheel in an approprate direction for achieving the desired results.

In order to start the power unit of the cart, the proper switch or button on the transmitter is manually activated whereby the receiver unit provided on the cart receives a signal for energizing the power plant or motor. The normal direction of movement for the cart is straight forward, and the cart will continue to move in this straight forward direction until a signal is sent to the receiver for altering the direction of movement. In order to turn in a right hand direction, the proper switch or button on the transmitter is activated for sending a signal to the right turn solenoid of the remote control system on the cart. Activation of the right turn solenoid causes the single wheel to rotate in the proper direction for altering the direction of movement of the cart toward the right hand direction. When a sufficient degree of turn has been achieved, the right turn switch of the transmitter may be released, whereby the single wheel is automatically returned to a normal centered position, and the movement of the cart will then be straight forward in the newly achieved direction. Of course, a left hand turn is accomplished in a similar manner. In order to stop the cart, the start switch is activated to send a signal to the receiver whereby the flow of current from the power source to the motor is interrupted, and the cart is "shut down."

Of course, suitable gear ratios are provided for the cart in order to maintain a maximum speed of approximately five miles per hour, thus precluding any accidental breakaway action of the cart, even in a downhill operation. In addition, a suitable handle mechanism is provided in order that the cart may be towed manually, if desired, rather than utilized as a powered unit. The entire unit is simple and efficient in operation and economical and durable in construction.

It is an important object of this invention to provide a powered golf bag cart which may be started and stopped by remote control.

It is another object of this invention to provide a powered golf bag cart in which the direction of movement of the cart may be varied by a remote control device.

Another object of this invention is to provide a remote controlled powered golf bag cart which is simple and efficient in operation and economical and durable in construction.

Other and further objects and advantageous features of the present invention will hereinafter more fully appear in connection with a detailed description of the drawings in which:

FIGURE 4 is a circuit diagram of a remote control system such as may be utilized in the invention.

FIGURE 5 is a plan view of one embodiment for pivoting of the steering wheel for the cart, and depicting the wheel in the normal centered position thereof.

FIGURE 6 is a view similar to FIGURE 5 showing the wheel in a pivoted position for turning of the cart.

Figure 1:
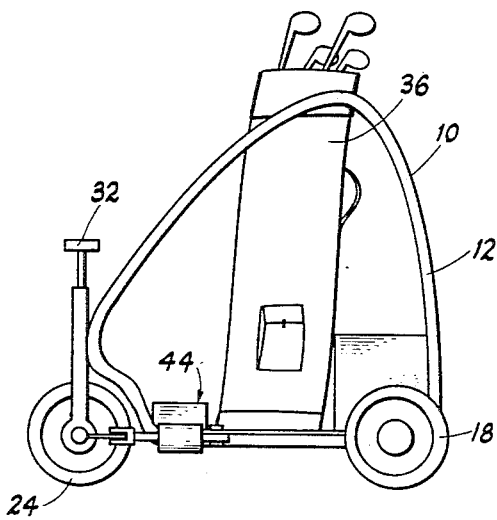
FIGURE 1 is a side elevational view of a golf bag cart embodying the invention.

Referring to the drawings in detail, reference character 10 generally indicates a golf bag cart comprising a pair of substantially identical oppositely disposed side frame members 12 and 14. The side members 12 and 14 may be of substantially any desired configuration, and are not limited to a frame-like structure. As depicted herein, however, the side frame members 12 and 14 are arranged with the front portions thereof spaced apart and the rear portions thereof converging toward a common point in order to define a substantially triangular planar surface or area between the lower ends or portions thereof whereby a plate or support member 16 may be secured thereto in any well known manner.

A pair of front wheels 18 and 20 are carried by an axle 22 which is journaled in the proximity of the front edge of the plate 16 in any well known or suitable manner (not shown). A rear wheel 24 is suitably journaled on an axle or stub shaft 26 which is secured to or carried by a bifurcated support member 28. The bifurcated member 28 receives a portion of the wheel 24 therein, as particularly shown in FIGURE 3, and is secured to the rear portion of the side member 12 and 14 by means of a vertically disposed cylindrical member 30 which is welded or otherwise secured between the converging portions of the side frames 12 and 14. The wheel 24 is freely rotatable about its own horizontal axis, as is well known, and is also freely rotatable in a vertical axis to provide for steering of the unit 10, as will be hereinafter set forth in detail.

A suitable handle member 32 is telescopically arranged within the cylinder 30 and secured therein such a manner that the handle 32 may be manually disposed in a retracted position therein when not in use, and may be manually extended by longitudinal pressure or force exerted thereon when it is desired to tow or pull the unit 10 along the course or terrain. In addition, it is preferable to provide a plurality of vertically spaced transversely extending cross members 34 between the spaced forward portions of the side frame 12 and 14 whereby a golf bag 36, or the like, may be disposed on the plate 16 and supported between the side frames 12 and 14 by the cross members 34. Of course, a suitable clip or frictional engagement device (not shown) may be provided for at least one of the cross members 34 for receiving the bag 36 therein, if desired, for securely retaining the bag 36 on the cart or unit 10 during operation thereof.

Figure 2:
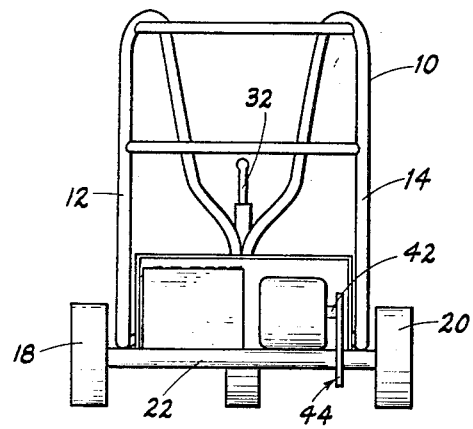
FIGURE 2 is a front elevational view of a golf bag cart embodying the invention.
Figure 3:
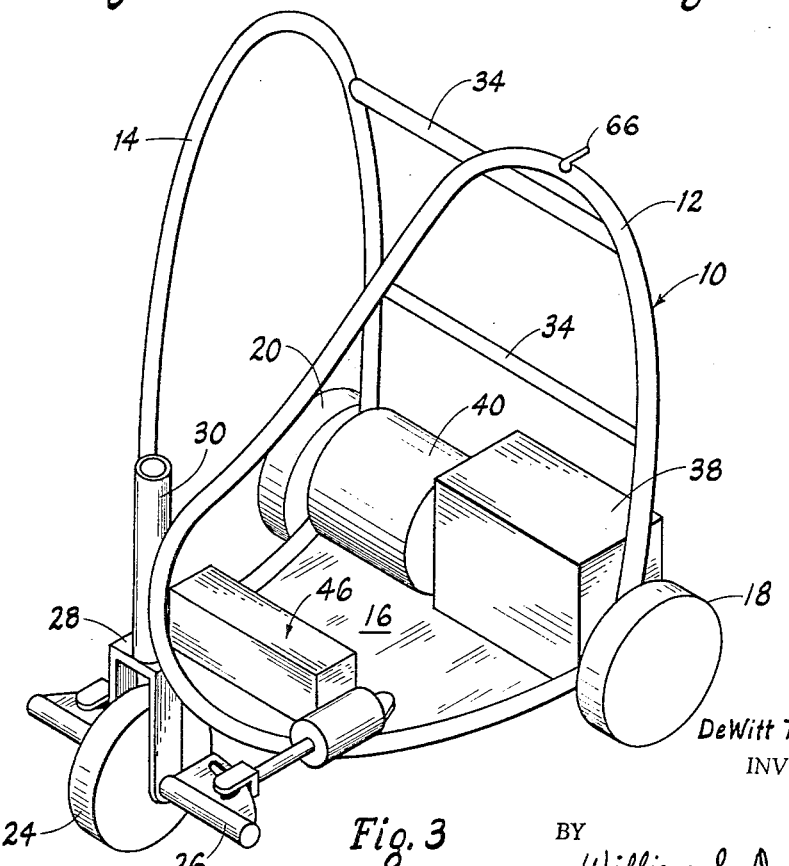
FIGURE 3 is a perspective view of a golf bag cart embodying the invention.

A suitable power source, such as a battery 38 is disposed on the plate 16 and may be removaby secured therein in any well known manner (not shown) to provide a power source or electrical current for a suitable motor 40 which is also secured to the plate 16 in any suitable manner (not shown). The output shaft 42 (FIGURES 2 and 4) is connected with the axle 24 through a suitable chain drive mechanism generally indicated at 44 which is of any desired drive ratio to provide the required rotational speed for the shaft 22 in accordance with the operational requirements of the unit 10. It is preferable that the drive ratio between the motor 40 and shaft 22 be such that the maximum speed for the unit 10 will be approximately five miles per hour, even when the unit is traveling on a downgrade. A remote control device, generally indicated at 46 in FIGURES 1, 3, and 4, is also mounted on the plate 16 in any suitable manner (not shown) and is electrically connected with the motor 40 and battery 38, as will be hereinafter set forth in detail.

The remote control receiver 46 is schematically illustrated in detail in FIGURE 4. However, it is to be understood that substantially any suitable remote control receiver may be utilized, and is not limited to the particular receiver depicted herein. In this particular illustration, it is preferable that the transmitter (not shown) carried by the user of the unit 10 be a frequency controlled, three tone modulated 27 megacycle range transmitter, with a range of approximately 600 feet. This is a conventional type transmitter such as used in remote control garage doors, model airplane controls, and the like. The transmitter is preferably provided with three push type buttons wherein one of the buttons is a "start" button, a second of the buttons is a "right hand turn" button, and the third button is a "left hand turn" button. Each of the three transmitter buttons or switches is tuned for sending forth or emitting a different frequency than the other of said buttons or switches. By way of example, the start button may be a frequency of 500 cycles per second, the right turn button may be a frequency of 750 cycles per second, and the left turn button may be a frequency of 1000 cycles per second. Assuming these particular frequencies for the transmitter, the receiver 46 will be controlled and tuned in a complementary or corresponding manner for actuation thereby.

The receiver generally indicated at 46 comprises a receiver portion 48 (shown in dashed lines) which is preferably a relayless, reed type, super heterodyne, three tone receiver, which is well known. The receiver portion 48 includes the toned reeds 50, 52 and 54. The reed 50 is preferably set at 500 cycles per second complementary to the start button of the transmitter, and may be considered as the "start" reed. The reed 52 is preferably set at 750 cycles per second complementary to the right turn button of the transmitter and may be considered as the "right turn" reed. The reed 54 is preferably set at 1000 cycles per second complementary to the left turn button of the transmitter and may be considered as the "left turn" reed. Each reed 50, 52 and 54 is provided with an associated contact 56, 58, and 60, respectively. Activation of the reed 50 closes the contact 56; activation of the reed 52 closes the contact 58; and activation of the reed 54 closes the contact 60, as is well known in devices of this type.

The receiver portion 48 is electrically connected with the positive side of the battery 38 through a resistor 62 and Zener diode 64, with an off-on switch 66 being interposed between the battery 38 and resistor 62. (The off-on switch 66 may be physically installed on one of the side frame members, such as the side frame 12, in any well known manner for convenience whereby the switch 66 may be manually positioned in the "on" position when it is desired to supply electrical current to the receiver portion 48, and in the "off" position when the unit 10 is not in use.) The resistor 62 is connected in series with the contact power of the receiver portion 48 and the Zener diode 64 is connected in parallel with the contact power of the receiver portion 48 whereby the resistor and diode function in the manner of a voltage regulator to drop the voltage of the battery 38 (preferably a twelve volt battery) to the desired operating voltage of the receiver 46.

The contact 56, which is closed up on actuation of the start reed 50, is electrically connected between the battery 38 and a starter relay 68 through a diode 70 whereby positive electric current or power is supplied to the starter relay 68 when the contact 56 is closed. The diode 70 functions in the manner of a check valve to preclude "back flow" of the electrical current, as will be hereinafter set forth in detail. A pair of co-acting contacts 72 and 74 are provided in association with the starter relay 70 and both contacts 72 and 74 are closed upon energization of the starter relay 70. The closing of the contact 72 directs the positive electrical current or power to the battery 40 through a rheostat 76 and suitable resistor 78 for driving the motor. The current is simultaneously sent through the closed contact 72 to a time-delay relay 80, which may be of any suitable type, such as a five second delay. This sends current through the time-delay relay contact 82 and to the line 84 for directing the current back to the time-delay relay 68 for temporarily holding current in the relay 68, thus assuring holding of the start of the motor 40. As hereinbefore set forth, the diode 70 precludes reverse movement of the current in a direction toward the contact 56, thus assuring that the current in line 84 will be directed to the relay 68.

The contact 58, which is closed upon actuation of the right turn reed 52, is electrically connected between the battery 38 and a right turn relay 86 whereby positive current is supplied to the coils of the relay 86 when the contact 58 is closed. A contact 88 is provided in association with the relay 86 and electric current is supplied to the contact 88 when the contact 74 is closed. As hereinbefore set forth the contact 74 is closed when the relay 68 is energized. Thus, current is waiting at the contact 88 at all times when the unit 10 is operating. The contact 88 is closed upon energization of the relay 86 whereby current is delivered to a right turn solenoid 90. The solenoid 90 is physically connected to the wheel 24 in a manner as will be hereinafter set forth whereby actuation of the solenoid 90 will cause the wheel 24 to be rotated about a vertical axis in a direction for altering the movement of the unit 10 toward a right hand direction. Of course, as soon as the flow of electricity through the contact 58 is ceased, the solenoid 90 will be deactivated whereby the wheel 24 will automatically return to the normal neutral or centered position thereof, as will be hereinafter set forth in detail.

The contact 54, which is closed upon actuation of the left turn reed 54, is electrically connected between the battery 38 and a left turn relay 92 whereby positive current is applied to the coils of the relay 92 when the contact 54 is closed. A contact 94 is provided in association with the relay 92 and is supplied with current through the closed contact 74 in the same manner as the contact 88. The contact 94 is closed upon energization of the relay 92 for directing current to a left turn solenoid 96. The solenoid 96 is physically connected to the wheel 24 in a manner as will be hereinafter set forth whereby activation of the solenoid 96 causes the wheel 24 to rotate about a vertical axis in a direction for altering the movement of the unit 10 toward a left hand direction. Of course, as soon as the flow of current through the contact 60 is ceased, the solenoid 96 will be deactivated whereby the wheel 24 will automatically return to the normal neutral or centered position thereof, as will be hereinafter set forth in detail.

In order to stop the movement of the unit 10 by remote control, a stop-and-hold relay 95 is connected with the contact 56. A contact 97 is provided in association with the stop-and-hold relay 95 and is electrically connected with the line 84. When it is desired to stop the unit 10, the start button of the transmitter is pressed for closing the contact 56. This directs positive current to the relay 95 for opening the contact 97. During the operation of the unit 10, the contact 97 is closed, as shown in FIGURE 4, whereby a circulation of current is maintained through the line 84 to the relay 68. This is due to the fact that the contact 82 of the relay 80 opens upon the passage of a given time interval (when the contact becomes sufficiently hot), which stops the flow of current through the relay 80 to the line 84. However, as shown in FIGURE 4, the contact 97 is connected with the contact 72 by means of the line 99 provided in the relay 82, and this supplies current to the contact 97 for closing thereof and directing the current back through the line 84, effectively directing the current back to the relay 68. The opening of the contact 97 by the activation of the relay 95 interrupts the flow of current to the relay 68 whereby the contact 72 opens and stops the flow of current to the motor 40.

The solenoids 90 and 96 are physically secured to the unit 10 in the proximity of the rear wheel 24, and may be pivotally mounted in any suitable manner at 98 and 100, respectively (FIGURES 5 and 6), to a cross member 16a disposed on or secured to or in the proximity of the plate 16 or the solenoids 90 and 92 may be secured directly to the plate 16, if desired. The solenoids 90 and 96 are substantially identical and are provided with reciprocal arms 102 and 104, respectively, which extend axially outward from the solenoids in a direction toward the axle 26. Each arm 102 and 104 is spring loaded whereby the arms are constantly urged in an outwardly direction with respect to the associated solenoid, or in a direction toward the axis 26.

The outermost end 106 of the arm 102 is connected with the axle 26 on the left hand side of the wheel 24, as viewed in FIGURES 5 and 6, in any suitable manner. As depicted herein the end 106 is slidably secured in any well known manner within an arcuate slot 108 provided in a forwardly extending flange 110 carried by the axle 26. The end 106 is normally engaged within a recess portion 112 (FIGURE 6) of the slot 108 when the wheel 24 is in the normal centered position thereof, and the solenoid 90 is inactive, as shown in FIGURE 5. The outermost end 114 of the arm 104 is similarly connected with the axle 26 on the right hand side of the wheel 24, with the end 114 being slidably secured to an arcuate slot 116 provided in a forwardly extending flange 118 carried by the axle 26. In the normal inoperative position of the solenoid 96, the end 114 is engaged with a recess portion 117 similar to the recess 112. Of course, the arms 102 and 104 may be connected with the axle 26 in any suitable manner, and there is no intention to limit the connection therebetween to that depicted herein.

When the right turn solenoid 90 is activated, as hereinbefore set forth, the arm 102 is retracted, and the connection between the end 106 thereof and the recess 112 causes the arm 102 to pull the plate 110 in a direction toward the solenoid 90. This causes the axle 26 to pivot about the center point thereof to simultaneously pivot the wheel 24 about a vertical axis as shown in FIGURE 6. The turning of the rear wheel 24 in this direction causes the direction of movement of the unit 10 to be altered in a right hand direction. As the axle 26 pivots, the end 114 of the arm rides freely in the slot 116 to preclude any unwanted resistance during the turning operation. As soon as the solenoid 90 is deactivated, the spring urged arm 102 is automatically moved to the normal extended position there through the spring action for restoring the axle 26 to the normal centered position thereof shown in FIGURE 5. In addition, the rear wheel 24 has a slight "rake" action similar to the action of a rear wheel in a three wheeled aircraft. The combination of the "rake" action of the rear wheel and the outward movement of the arm 102 under the pressure of the spring (not shown) the rear wheel is positively returned to the straight forward moving position for the guidance of the unit 10.

Of course, turning of the unit 10 in a left hand direction is accomplished in a similar but reverse manner from the turning thereof in a right hand direction. Actuation of the left turn solenoid 96 causes the arm 104 to retract for pivoting the axle 26 in a reverse direction. When the solenoid 96 is deactivated, the spring urged arm 104 returns to the normal extended position thereof which, in combination with the "rake" action of the rear wheel 24, assures that the wheel 24 will be returned to the normal straight forward moving position therefor.

It is to be understood that whereas the solenoids 92 and 96 are depicted herein for turning of the wheel 24, it is anticipated that a motor may be substituted for each of the solenoids whereby alternate actuation of the motors will result in alternate turning of the wheel in a manner similar to that hereinbefore set forth. It is also anticipated that a single motor of the reversible or two directional type may be utilized in lieu of the two solenoids for turning of the wheel 24. It is further to be understood that the frame-like sidewall structure for the unit 10 is illustrative of one embodiment of the invention but substantially any desired body construction may be utilized for supporting a golf bag and the clubs carried therein.

Furthermore, a suitable gear drive (not shown) may be utilized in lieu of the pulley drive arrangement between the motor and the front or drive wheels for transmitting rotation to the drive wheels. The gear drive or pulley drive may also be arranged for providing a braking action for the unit 10, or a separate braking device (not shown) may be provided therefor. The braking device may be of a type operable by remote control, for example, an electric braking mechanism may be provided which is actuated by the remote control means in a manner similar to that hereinbefore set forth with regard to the stopping, starting, and turning of the unit 10.

By way of summary, the unit 10 comprises a wheel mounted powered housing portion for supporting a golf ball and operable by remote control for moving along a golf course, or the like, in accordance with the desires of the golfer, or other user. The user of the unit 10 may carry the transmitter on his person and when it is desired to start the movement of the unit 10, the "start" button of the transmitter may be depressed for sending a signal to the start reel 50 of the receiver 46. This activated the electrical circuit of the receiver 46 for directing power from the battery 38 to the motor 40 whereby the front wheels 18 and 20 are driven for moving the unit 10 along the terrain. In order to turn the unit 10 in a right hand direction, the user depresses the "right turn" button whereby the right turn reed 52 is activated for supplying current to the right turn solenoid 90. The right turn solenoid 90, being physically connected with the rear steering wheel 24, causes the wheel 24 to pivot about a vertical axis in the proper direction for altering the movement of the unit 10 toward a right hand direction. Similarly, the unit 10 may be turned in a left hand direction by manual depression of the "left turn" button of the transmitter whereby the left turn reed 54 is activated for directing current to the left turn solenoid 96. The left turn solenoid 96, being physically connected with the wheel 24, causes the wheel 24 to pivot about a vertical axis in the proper direction for steering the unit 10 in a left hand direction. The unit 10 may also be stopped by remote control. The "start" button may be depressed, whereby the electrical circuit of the receiver 46 functions to break the connection between the battery 38 and motor 40 to stop the powered movement of the unit.

Of course, it is also anticipated that the front driving whels may be connected together through a differential drive mechanism (not shown) as is well known whereby braking of one of the drive wheels will cause the said one wheel to cease forward movement and permit the opposite wheel to continue its forward driving action. Since the said one drive wheel is stopped by the braking thereof, the opposite wheel will be caused to move in a circular path with the braked wheel becoming the pivot of the path inscribed by the moving wheel. Thus, the braked wheel will pivot about a vertical axis and will become the steering wheel for the turning of the cart. When it is desired to turn the cart in a right hand direction, the right driving wheel will be braked whereby the left wheel will move in a circular path with the right wheel functioning as a steering pivot, thus turning the cart in a right hand direction. Conversely, when it is desired to turn the cart in a left hand direction, the left driving wheel will be braked whereby the right wheel will move in a circular path with the left wheel functioning as a steering pivot, thus turning the cart in a left hand direction.

If two rear wheels are provided for the cart in lieu of the single wheel shown herein, it may be desirable to provided for independent rotation for the rear wheels for facilitating the turning and other manipulation of the cart.

From the foregoing it will be apparent that the present invention contemplates a powered golf bag cart which may be operated by remote control. The device may be started, and stopped by remote control, and the direction of movement thereof may be altered and controlled as desired by remote control means. The novel golf bag cart is simple and efficient in operation and economical and durable in construction.

Whereas the present invention has been described in particular relation to the drawings attached hereto, it should be understood that other and further modifications, apart from those shown or suggested herein, may be made within the scope of this invention.

What is claimed is:

1. A golf bag cart comprising a housing portion for supporting the golf bag, a plurality of wheels journalled on the housing, at least one of said wheels being pivotal about a vertical axis for steering the cart, power steering means associated with said pivotal wheel, power means carried by the housing and operably connected with a portion of the wheels for transmitting rotation thereto for driving of the cart, remote control receiver means provided on the housing for receiving signals from a remote transmitter means to provide for remote control operation of the cart, said remote transmitter means comprising a plurality of manually operable buttons wherein manual actuation of one of said buttons initiates a signal of a frequency for energizing the power means, actuation of a second of said buttons initiates a signal of a frequency for energizing the power steering means for steering the cart in one direction, manual actuation of a third button initiates a signal of a frequency for energizing the power steering means for steering the cart in a second direction, and second manual actuation of the first mentioned button initiates a signal of a frequency for stopping the operation of the power means, said pivotal wheel being vertically pivotal by said power steering means during the steering in said first and second directions, plate means carried by said pivotal wheel and having arcuate slots provided therein, and means for slidably connecting said power steering means with said arcuate slots to provide said vertical pivoting of the pivotal wheel upon steering of the cart.

2. A golf bag cart comprising a housing portion for supporting the golf bag, a plurality of wheels journalled on the housing, at least one of said wheels being pivotal about a vertical axis for steering of the cart, power steering means associated with said pivotal wheel, power means carried by the housing and operably connected with a portion of the wheels for transmitting rotation thereto for driving of the cart, remote control radio receiver means provided on the housing for receiving signals from a remote radio transmitter means to provide for remote radio control operation of the cart, said remote radio transmitter means comprising a plurality of manually operable buttons wherein manual actuation of one of said buttons initiates a radio signal of a frequency for energizing the power means, actuation of a second of said buttons initiates a radio signal of a frequency for energizing the power steering means for steering the cart in one direction, manual actuation of a third button initiates a radio signal of a frequency for energizing the power steering means for steering the cart in a second direction, and second manual actuation of the first mentioned button initiates a radio signal of a frequency for stopping the operation of the power means.

3. A golf bag cart as set forth in claim 2 wherein the remote control radio receiver means is tuned in accordance with the remote radio transmitter for receiving a first modulated radio signal therefrom to supply power to the power means, for receiving a second modulated radio signal therefrom to pivot the steering wheel in a direction for turning the cart in a right hand direction, for receiving a third modulated radio signal therefrom for pivoting the steering wheel in a direction for turning the cart in a left hand direction, and for receiving a fourth modulated radio signal therefrom for interrupting the supply of power to the power means, and the said four modulated radio signals are modulated at frequencies detectable from one another and at a frequency less than the carrier frequency of the remote control radio transmitter.

4. A golf bag cart as set forth in claim 2 wherein the wheels comprise a pair of spaced complementary front driving wheels connected with the power means for rotation thereby, and a third wheel spaced rearwardly of the front wheels and being pivotal about a vertical axis for steering of the cart.

5. A golf bag cart as set forth in claim 2 wherein said power means includes a source of electrical current and a motor operable thereby for transmitting rotation to the driving wheels.

6. A golf cart as set forth in claim 5 wherein said remote control radio receiver means includes a first modulated radio signal responsive means for operably connecting the electrical current source with the motor for actuation of the motor, a second modulated radio signal responsive means for effecting a pivotal movement of the steering wheel about a vertical axis in one direction for altering the direction of movement of the cart toward one direction, and third modulated radio signal responsive means for effecting a pivotal movement of the steering wheel about a vertical axis in an opposite direction for altering the direction of movement of the cart toward a second direction, wherein said power steering means are solenoid means activated by the radio receiver means, plate means carried by the pivotal wheel and having arcuate slots provided therein, said arcuate slots being slidably connected with the solenoid means whereby activation of the solenoid means provide said vertical pivotal movement for said pivotal wheel.

References Cited

UNITED STATES PATENTS

| | | |
|---|---|---|
| 2,706,008 | 4/1955 | Voigt. |
| 2,836,253 | 5/1958 | Lovell. |
| 2,903,082 | 9/1959 | Marcus. |
| 3,312,300 | 4/1967 | Jones _____ 180—19 |

LEO FRIAGLIA, Primary Examiner

J. A. PEKAR, Assistant Examiner